US010025006B2

(12) United States Patent
Yoshizawa et al.

(10) Patent No.: US 10,025,006 B2
(45) Date of Patent: Jul. 17, 2018

(54) METHOD OF MANUFACTURING STRUCTURE

(71) Applicant: FUJIFILM Corporation, Tokyo (JP)

(72) Inventors: Hirotoshi Yoshizawa, Ashigarakami-gun (JP); Shinichiro Sonoda, Ashigarakami-gun (JP); Tatsuya Yoshihiro, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/787,440

(22) Filed: Oct. 18, 2017

(65) Prior Publication Data

US 2018/0074230 A1    Mar. 15, 2018

Related U.S. Application Data

(63) Continuation of application No. PCT/JP2016/001556, filed on Mar. 17, 2016.

(30) Foreign Application Priority Data

Apr. 20, 2015 (JP) .................................. 2015-085648

(51) Int. Cl.
*G02B 1/118* (2015.01)
*C03C 17/25* (2006.01)

(52) U.S. Cl.
CPC .............. *G02B 1/118* (2013.01); *C03C 17/25* (2013.01); *C03C 2217/214* (2013.01)

(58) Field of Classification Search
CPC ..................................................... G02B 1/118
See application file for complete search history.

(56) References Cited

U.S. PATENT DOCUMENTS

2010/0296168 A1\* 11/2010 Sano ...................... G02B 1/113
359/586
2012/0207973 A1    8/2012 Sakai et al.
(Continued)

FOREIGN PATENT DOCUMENTS

JP    2005-275372 A    10/2005
JP    2012-185495 A    9/2012
(Continued)

OTHER PUBLICATIONS

English translation of Written Opinion of the International Searching Authority dated Aug. 9, 2016, issued in PCT/JP2016/001556 (Form PCT/ISA/237).
(Continued)

*Primary Examiner* — Alex A Rolland
(74) *Attorney, Agent, or Firm* — Birch, Stewart, Kolasch & Birch, LLP

(57) ABSTRACT

Provided is a method of manufacturing a structure having a transparent fine uneven structural body formed by hot water treatment, in which a finer uneven structure is formed. Provided is a method of manufacturing a structure, the method being for manufacturing a structure including a substrate, and a transparent fine uneven structural body which is formed on a surface of the substrate by hot water treatment, including: a first step of forming a precursor film of the transparent fine uneven structural body on the substrate; a second step of forming a fine uneven structure on a surface of the precursor film; and a third step of subjecting, to hot water treatment, the precursor film on which the fine uneven structure is formed to form the transparent fine uneven structural body in which a peak value $v_0$ of space frequency of the unevenness of the fine uneven structure formed in the second step satisfies $v < v_0$ (Expression I). In Expression I, $v_0$ represents a peak value of space frequency of the fine uneven structure, and $v$ represents a peak value (Continued)

of space frequency of the transparent fine uneven structural body in a case in which the fine uneven structure is not formed on the surface of the precursor film.

10 Claims, 5 Drawing Sheets

(56) References Cited

U.S. PATENT DOCUMENTS

2014/0016204 A1  1/2014  Hakuta et al.
2015/0378058 A1  12/2015 Sonoda et al.

FOREIGN PATENT DOCUMENTS

| JP | 2012-198330 A | 10/2012 |
| JP | 2014-21146 A  | 2/2014  |
| JP | 2014-81656 A  | 5/2014  |
| JP | 2014-178502 A | 9/2014  |
| JP | 2015-4919 A   | 1/2015  |

OTHER PUBLICATIONS

International Search Report dated Aug. 9, 2016, issued in PCT/JP2016/001556 (Form PCT/ISA/210).

* cited by examiner

METHOD OF MANUFACTURING STRUCTURE

CROSS-REFERENCE TO RELATED APPLICATIONS

This application is a continuation application of International Application No. PCT/JP2016/001556, filed Mar. 17, 2016, the disclosure of which is incorporated herein by reference in its entirety. Further, this application claims priority from Japanese Patent Application No. 2015-085648, filed Apr. 20, 2015, the disclosure of which is incorporated herein by reference in its entirety.

BACKGROUND OF THE INVENTION

1. Field of the Invention

The present invention relates to a method of manufacturing a structure including a transparent fine uneven structural body which is obtained by hot water treatment.

2. Description of the Related Art

In the related art, in a lens (transparent substrate) formed by using a light-transmitting member such as glass or a plastic, an antireflection structural body is provided on a light incident surface in order to reduce the loss of transmitted light caused by surface reflection. As an antireflection structural body to visible light, a dielectric multilayer film or a fine uneven structural body having a shorter pitch than a wavelength of visible light is known.

For example, JP2005-275372A discloses a configuration in which a fine uneven film is formed on a substrate with a transparent thin film layer interposed therebetween. The uneven film includes alumina as a main component, and the transparent thin film layer contains at least one of zirconia, silica, titania, or zinc oxide. The uneven film and the transparent thin film layer under the uneven film are obtained by performing hot water treatment on a multicomponent film formed by using a coating liquid at least containing at least one compound of zirconia, silica, titania, or zinc oxide and an aluminum compound. An aluminum hydrate called boehmite is obtained by performing hot water treatment on the aluminum compound. The surface of boehmite has a fine uneven structure (hereinafter, sometimes referred to as a boehmite fine uneven structure) and has satisfactory antireflection performance. Therefore, the boehmite fine uneven structure is formed as an antireflection film of an optical element or the like.

In addition, JP2014-081656A discloses an optical sheet that is an uneven pattern sheet which is formed of a transparent material and in which an uneven structure Z and is formed by superimposing an uneven structure X and an uneven structure Y, is formed on one surface. The uneven structure X is a one-dimensional or two-dimensional uneven structure which has a most frequent pitch of unevenness of 2 to 200 μm and a ratio of the most frequent height with respect to the most frequent pitch of 0.420 to 0.714, and the uneven structure Y is a two-dimensional uneven structure which has a most frequent pitch of unevenness of 3 to 380 nm and a ratio of the most frequent height with respect to the most frequent pitch of 0.5 to 10 and is arranged in a hexagonal pattern with lattice defects that provide diversity of filling directions. According to such a configuration, excellent light extraction efficiency is exhibited.

SUMMARY OF THE INVENTION

The boehmite fine uneven structure has satisfactory antireflection performance. However, in a case of forming a structure by the method of the related art as described in JP2005-275372A, scattered light is generated at a low but intolerable level. The scattered light is recognized as fogging on the coated surface of an optical element and has a great effect on the quality of the optical element. The present inventors thought that the reason for causing the fogging in the optical element is that a boehmite fine uneven structure is random. That is, it is thought that in a case in which a large number of fluctuation components having a large size of about the wavelength of light or larger are present in the boehmite fine uneven structure, the fine uneven structure has an effect on light scattering. In this manner, in the optical element including the fine uneven structure as an antireflection structural body or the like, a finer uneven structure in which a long-period fluctuation is reduced is demanded.

This thought is consistent with the following findings of the present inventors.

The degree of the long-period fluctuation of the boehmite fine uneven structure can be estimated from the Fourier transform of a structural pattern. By performing discrete Fourier transform on an electron microscope image that is obtained by observing the boehmite fine uneven structure pattern from the top, the intensity spectrum of the space frequency can be calculated, and an intensity peak position thereof can be used as a reference of the structure size. As a result of investigating a correlation between the result of scattered light intensity measurement and the intensity peak of the Fourier transform spectrum, the present inventors found that as this peak approaches a high-frequency side, the scattered light intensity decreases.

As means for reducing the long-period fluctuation components, for example, there is the uneven structure disclosed in JP2014-081656A. However, in the preparation step of the uneven structure disclosed in JP2014-081656A, an accurate liquid phase process in which a single particle film has to be prepared on the surface of a sample or the like before the uneven structure is formed is required, and thus there is a problem of difficulty in setting conditions for applying the structure to optical elements having various shapes such as a concave surface and a convex surface.

The present invention is made in consideration of the above circumstances and an object thereof is to provide a method of manufacturing a structure including a transparent fine uneven structural body which is obtained by hot water treatment without requiring an accurate liquid phase process, in which scattered light can be reduced and a finer uneven structure can be formed.

The present invention is made base on the following findings of the present inventors.

The degree of the long-period fluctuation of the boehmite fine uneven structure can be estimated from Fourier transformation of a structure pattern. By performing discrete Fourier transform on an electron microscope image which is obtained by observing the boehmite fine uneven structure pattern from the top, the intensity spectrum of the space frequency can be calculated and an intensity peak position thereof can be used as a reference of the structure size. As a result of investigating a correlation between a correlation between the result of scattered light intensity measurement and the intensity peak of the Fourier transform spectrum, the present inventors found that as this peak approaches a high-frequency side, the scattered light intensity decreases.

In a case in which a periodic spatial distribution (periodic structure) that is intentionally formed is present in the spatial distribution of a boehmite fine uneven structure in which a fine uneven structure is not formed before hot water treatment, that is, a boehmite fine uneven structure of the related art, it is thought that the convolution of the space frequency (δ function) of the periodic structure to the space frequency of the boehmite fine uneven structure becomes an actual space frequency distribution.

Based on the above idea, in a case in which the peak value of the space frequency of a fine uneven structure that is intentionally formed before hot water treatment is greater than the peak value of the space frequency in a case of performing hot water treatment without forming a fine uneven structure, the peak value of the space frequency of the fine uneven structure formed by forming the fine uneven structure before hot water treatment and then performing the hot water treatment is positioned to be closer to a high-frequency side. Scattered light is generated in a case in which particularly, a component of equal to or greater than the wavelength order (wavelength/refractive index of medium) is present in the spatial range. Therefore, light scattering is reduced by setting the space frequency distribution to be on a high-frequency side.

A method of manufacturing a structure having a substrate, and a transparent fine uneven structural body which is formed on a surface of the substrate by hot water treatment, the method comprising:

a first step of forming a precursor film of the transparent fine uneven structural body on the substrate;

a second step of forming a fine uneven structure on a surface of the precursor film; and a third step of forming the transparent fine uneven structural body by subjecting, to hot water treatment, the precursor film on which the fine uneven structure is formed, in which the fine uneven structure formed in the second step satisfies Expression I.

$$v < v_0 \quad \text{Expression I}$$

In Expression I, $v_0$ represents a peak value of space frequency of the fine uneven structure formed in the second step, and $v$ represents a peak value of space frequency of a transparent fine uneven structural body obtained in a case in which hot water treatment is performed under the same condition as in the hot water treatment in the third step without forming a fine uneven structure on the surface of the precursor film.

Here, the term "peak value $v$ of space frequency of the fine uneven structure" is defined as a value obtained as follows.

First, hot water treatment is performed on the precursor film without forming a fine uneven structure on the surface of the precursor film to obtain a transparent fine uneven structural body. Next, an electron microscope image (magnification: 6,000 times, acceleration voltage: 7.0 kV) obtained by imaging the surface of the fine uneven structural body using a scanning electron microscope S-4100 (manufactured by Hitachi Ltd.) is cut into a size of 600×400 pixels and undergoes two-dimensional Fourier transformation using an image processing software Image J. The intensity spectrum of the obtained two-dimensional space frequency is integrated in an azimuthal angle direction and the intensity of the one-dimensional space frequency spectrum is obtained at a resolution of about 0.015 $\mu m^{-1}$. Further, a relationship between the one-dimensional space frequency and the spectral intensity is calculated by taking a front-and-rear three-point moving average. The maximum value of the spectral intensity is set to the maximum value in the space frequency spectrum obtained in advance and the space frequency in a case in which the maximum value is taken is defined as a peak value $v$.

The fine uneven structure formed in the second step is not limited to a fine uneven structure which is periodically formed and any arrangement can be employed as long as the uneven structure satisfies Expression I in the precursor film. In addition, in order to obtain the maximum effect, it is desirable that this uneven structure is formed over the entire optically effective surface. However, in a case in which least a part of the uneven structure satisfying Expression I is present in the optically effective surface, it is possible to obtain the effect on the region. Therefore, as the ratio of the uneven structure formed region occupying the optically effective surface increases, the effect is more likely to be obtained. Thus, it is desirable that the region becomes larger.

In addition, it is preferable that the peak value $v_0$ of space frequency of the fine uneven structure formed in the second step is greater than 5 $\mu m^{-1}$ in consideration of a short wavelength limit of 400 nm since it may be considered that the short wavelength limit of the general wavelength range of visible light is 360 to 400 nm and the long wavelength limit thereof is 760 to 830 nm (JIS Z 8120).

It is preferable that the fine uneven structure in the second step is periodic.

The second step may be a step of forming a mask having a plurality of openings on the precursor film and dissolving a part of the surface of the precursor film using the mask to form the fine uneven structure.

The second step may be a step of forming a mask having a plurality of openings on the precursor film and peeling off a part of the surface of the precursor film using the mask to form the fine uneven structure.

It is preferable that the transparent fine uneven structural body has an alumina hydrate as a main component.

The precursor film may have at least one selected from oxides, hydroxides and nitrides of aluminum, or aluminum as a main component and the alumina hydrate may be obtained by subjecting the precursor film to hot water treatment.

The precursor film may include at least one selected from $ZrO_2$, $SiO_2$, $TiO_2$, $ZnO$, and $MgO$ and may have at least one selected from oxides, hydroxides and nitrides of aluminum, or aluminum as a main component, and the alumina hydrate may be obtained by subjecting the precursor film to hot water treatment.

The term "main component" used in the present invention and the specification means a component the content of which is 80% by mass or more with respect to all the constitutional components of the film.

The first step may have a step of forming an interlayer between the substrate and the precursor film.

The structure may be an optical member formed by providing an antireflection film on a transparent substrate, and in this case, it is preferable that the substrate is the transparent substrate, and the antireflection film is formed by providing the transparent fine uneven structural body on a surface thereof.

Here, the term "transparent" means that the substrate is transparent to a wavelength of light the reflection of which is tried to be prevented in the optical member (antireflection target light) and the internal transmittance is substantially 10% or higher.

Here, the peak value of space frequency of the transparent fine uneven structural body obtained by the method of manufacturing a structure of the present invention is set to $v_1$.

The term "peak value $v_1$ of space frequency of the transparent fine uneven structural body" is defined as a value obtained as follows.

It is defined as a peak value of space frequency of the transparent fine uneven structural body obtained with respect to a surface of the transparent fine uneven structural body resulted by hot water treatment of the precursor film having the fine uneven structure formed on a surface thereof. The peak value is obtained in a similar manner to the peak value $v$ of space frequency of the fine uneven structure formed in the second step of the manufacturing method of the present invention.

A relationship between the "peak value $v$ of space frequency" and the "peak value $v_1$ of space frequency" satisfies Expression II.

$$v < v_1 \qquad \text{Expression II}$$

The method of manufacturing a structure of the present invention is a method of manufacturing a structure having a substrate, and a transparent fine uneven structural body which is formed on a surface of the substrate by hot water treatment including: a first step of forming a precursor film of the transparent fine uneven structural body on the substrate; a second step of forming a fine uneven structure on a surface of the precursor film; and a third step of forming the transparent fine uneven structural body by subjecting, to hot water treatment, the precursor film on which the fine uneven structure is formed, in which the peak value $v_0$ of space frequency of the fine uneven structure formed in the second step satisfies Expression I. According to the manufacturing method of the present invention, it is possible to obtain a finer uneven structure of a transparent fine uneven structural body as compared to an uneven structural body obtained in a case of performing hot water treatment without forming a fine uneven structure on the surface of the precursor film, that is, a transparent fine uneven structural body of the related art.

DESCRIPTION OF THE PREFERRED EMBODIMENTS

Figure 1:
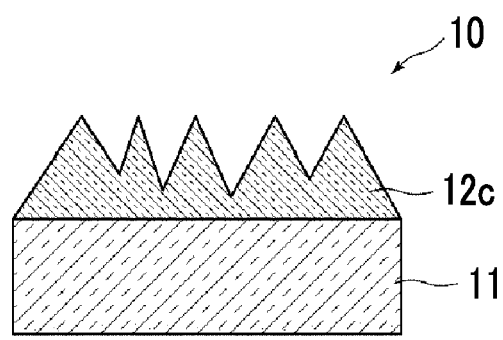
FIG. 1 is a cross-sectional schematic view showing an example of a structure according to the present invention.
Figure 2:
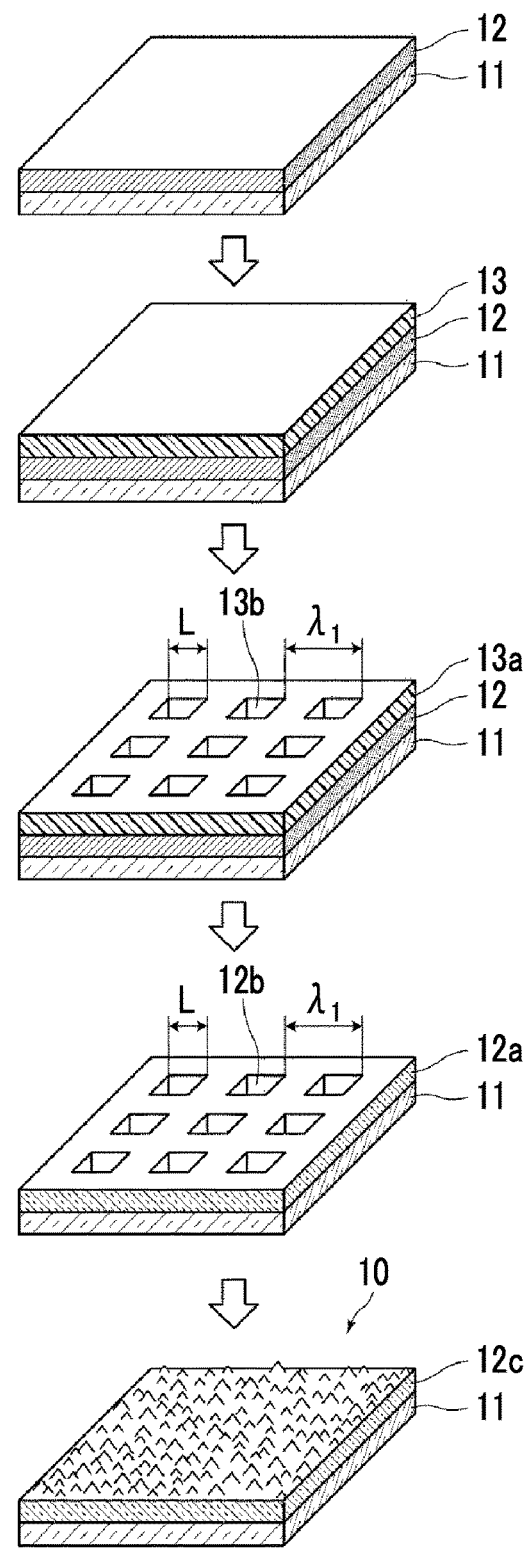
FIG. 2 is a perspective view showing a method of manufacturing a structure according to the present invention.

Hereinafter, an embodiment of a method of manufacturing a structure of the present invention will be described. FIG. 1 is a cross-sectional schematic view showing an example of a structure according to the present invention. FIG. 2 is a perspective view showing a method of manufacturing a structure according to the present invention.

<<Method of Manufacturing Structure>>

A method of manufacturing a structure of the present invention is a method of manufacturing a structure having a substrate and a transparent fine uneven structural body which is formed on the surface by hot water treatment. The method includes a first step of forming a precursor film of the transparent fine uneven structural body on the substrate, a second step of forming a fine uneven structure on a surface of the precursor film, and a third step of forming the transparent fine uneven structural body by subjecting, to hot water treatment, the precursor film on which the fine uneven structure is formed, and the fine uneven structure formed in the second step satisfies Expression I.

$$v < v_0 \qquad \text{Expression I}$$

In Expression I, $v_0$ represents a peak value of space frequency of the fine uneven structure formed in the second step, and $v$ represents a peak value of space frequency of a transparent fine uneven structural body obtained in a case of performing hot water treatment under the same conditions as in the hot water treatment in the third step without forming a fine uneven structure on the surface of the precursor film.

As shown in FIG. 1, a structure 10 manufactured by the manufacturing method of the present invention includes a substrate 11, and a transparent fine uneven structural body 12c which is formed on the substrate 11. Hereinafter, the method of manufacturing a structure of the present invention will be described with reference to FIG. 2.

<First Step>

A precursor film 12 of the transparent fine uneven structural body is formed on the substrate 11. The precursor film 12 is formed into the transparent fine uneven structural body 12c by performing hot water treatment.

(Substrate)

Although not particularly limited, the material for the substrate 11 preferably has resistance to hot water treatment and a method of forming a fine uneven structure. Examples thereof include Cu, stainless steel material (SUS), Si, Ge, GaAs, and ceramics. The composition of stainless steel material is not particularly limited and known austenitic stainless steel (chromium-nickel-based), martensitic stainless steel (chromium-based), ferritic stainless steel (chromium-based), dual phase stainless steel (chromium-nickel-based), and precipitation hardened stainless steel (chromium-nickel-based) can be used.

In addition, in a case in which the structure 10 is an optical member, the substrate 11 is preferably a transparent substrate. As the material for the transparent substrate, glass, plastics, and the like can be used. The shape of the transparent substrate is not particularly limited and may be a flat plate, a concave lens, a convex lens and the like, which are mainly used in an optical device. A substrate formed by a curved surface having a positive or negative curvature and a flat surface in combination may be used. It is preferable that a refractive index $n_s$ of the transparent substrate is higher than 1.65 and lower than 1.74. Specific examples of the material satisfying the above condition include S-NBH5 (manufactured by Ohara Inc.), S-LAL18 (manufactured by Ohara Inc.), MR-7 (manufactured by Mitsui Chemicals Inc.), MR-174 (manufactured by Mitsui Chemicals Inc.), general lanthanum glass, flint glass, a thiourethane resin, and an episulfide resin.

(Precursor Film)

It is preferable that the precursor film 12 has at least one selected from oxides, hydroxides and nitrides of aluminum, or aluminum as a main component.

In addition, the precursor film may include at least one selected from $ZrO_2$, $SiO_2$, $TiO_2$, ZnO, and MgO and has at least one selected from oxides, hydroxides and nitrides of aluminum, or aluminum as a main component. The precursor film particularly preferably includes aluminum or alumina.

In the present invention, it is preferable that the precursor film 12 is formed by vapor phase deposition such as vacuum evaporation, plasma sputtering, electron cyclotron sputtering, or ion plating.

(Transparent Fine Uneven Structural Body)

The alumina hydrate constituting the transparent fine uneven structural body is boehmite (denoted as $Al_2O_3.H_2O$ or AlOOH) which is an alumina monohydrate, bayerite (denoted as $Al_2O_3.3H_2O$ or $Al(OH)_3$) which is alumina trihydrate (aluminum hydroxide), or the like.

The transparent fine uneven structural body 12c has a saw-toothed cross section although the sizes of the convex portions (the sizes of the apexes) and the directions thereof are different.

<Second Step>

A resist film 13 is formed on the precursor film 12. Next, a periodic pattern in which openings 13b are arranged at a peak value $v_0$ of space frequency over the entire resist film 13 is drawn by an electron beam. The opening 13b is formed into a square shape in which the length of one side is L when viewed from the top. Next, a resist film 13a on which a periodic fine uneven structure is formed (hereinafter, simply referred to as a resist film 13a) is obtained by developing the resist film 13.

The shape of the opening 13b is preferably a circular, oval, rectangular or polygonal shape other than a square shape and is more preferably a circular or a square shape from the viewpoint of forming a fine uneven structure.

Here, a method of obtaining the conditions for manufacturing the fine uneven structure such that the peak value $v_0$ of space frequency of the periodic pattern satisfies Expression I will be described.

A precursor film is formed on the substrate as in the first step. Next, a fine uneven structure is not formed without performing electron beam lithography in the second step or without performing the second step itself, and hot water treatment is performed under the same conditions as in hot water treatment to be performed in the third step, which will be described later. In this manner, a transparent fine uneven structural body is formed on the substrate and thus a structure is prepared. That is, this structure is different from the structure according to the present invention and is obtained by performing hot water treatment without forming a fine uneven structure on the precursor film.

First, the peak value $v$ of space frequency of the structure is obtained according to the above method and then the peak value $v_0$ of space frequency of the unevenness is obtained such that the value satisfies Expression I.

$$v<v_0 \quad \text{Expression I}$$

As the fine uneven structure formed in the second step becomes finer, a peak value $v$ of space frequency of the transparent fine uneven structural body is shifted to a higher frequency side. Generally, the peak value $v$ of space frequency of a fine uneven structure obtained by hot water treatment varies according to the kind and the thickness of the precursor film, and thus the fine uneven structure formed in the second step may satisfy Expression I.

For example, in a case in which the precursor film is an alumina film having a thickness of 80 nm, the peak value $v$ of space frequency is 3 to 4 $\mu m^{-1}$. Thus, in order to obtain a peak value $v_0$ of space frequency larger than the peak value $v$ of space frequency, in a case in which the uneven structure has a periodic pattern, the period of unevenness corresponding to the peak value can be obtained by taking the inverse number of the peak value $v$ of space frequency. In a case in which the peak value $v$ of space frequency is 3 to 4 $\mu m^{-1}$ or more, the period of unevenness is preferably smaller than 250 nm, more preferably 200 nm or less, and even more preferably 150 nm or less. In addition, for example, in a case in which the precursor film is an aluminum film having a thickness of 60 nm, the peak value $v$ of space frequency is 3.5 to 4.5 $\mu m^{-1}$. Thus, in a case in which the uneven structure has a periodic pattern, the period of unevenness is preferably smaller than 222 nm, more preferably 200 nm or less, and even more preferably 150 nm or less. Here, the period of unevenness means a distance from one end of the unevenness to the other end of the concave portion with the convex portion interposed therebetween as shown in FIG. 2.

In a case of using lithography technology, the distance varies depending on the limit of refining technology such as irradiation light or the sensitivity of the resist. However, the distance is practically 15 nm or more. In a case in which the uneven structure has a periodic pattern, by setting the interval between each portion of the unevenness to 200 nm or less, the space frequency of the fine uneven structure formed in the second step can be set to about 5 $\mu m^{-1}$. Thus, the peak value of space frequency of the transparent fine uneven structural body 12c after hot water treatment is performed can be set to greater than 5 $\mu m^{-1}$.

In addition, in a case in which the structure is used as an optical member, satisfactory antireflection properties can be obtained by such a transparent fine uneven structure and further light scattering can be satisfactorily reduced.

Next, a fine uneven structure is formed by dissolving a part of the surface of the precursor film 12 by using the resist film 13a as a mask. As a solution for dissolving the surface of the precursor film 12, known solutions such as basic solutions and acidic solutions can be used as long as the solution dissolves the surface of the precursor film. Examples of basic solutions include solutions of tetramethyl ammonium hydroxide (TMAH) and sodium hydroxide. Examples of acidic solutions include solutions of hydrofluoric acid, hydrochloric acid, and sulfuric acid.

The etching depth is in a such depth range that the film thickness of the convex portion after etching is 20 nm or more and is required to have a depth of at least 5 nm or more from the viewpoint of forming a finer uneven structure than an uneven structure of the related art after hot water treatment and reducing light scattering. In a case of a sample (having a film thickness of 80 nm) in Examples of the specification, the depth is preferably 5 to 60 nm.

In addition, as another method of forming a fine uneven structure on the surface of the precursor film 12, a method including forming the resist film 13a having the plurality of openings 13b on the precursor film 12 as described above and peeling off a part of the surface of the precursor film 12 using the resist film 13a as a mask may be used.

The peeling used herein means dry etching and as a method of peeling, plasma etching, reactive ion etching, ion beam etching, and the like can be used as long as unevenness can be formed on the surface of the precursor film 12. As a gas used in plasma etching, Ar, Ar/O$_2$, HBr/Ar, CF$_4$/O$_2$, SF$_6$/O$_2$, CF$_4$/SF$_6$, and the like may be used.

In a case of forming a fine uneven structure by dry etching, a mask may be used and a fine uneven structure may be formed without using a mask. In a case of forming a fine uneven structure without using a mask, etching conditions such as the gas used in dry etching and acceleration energy are set such that the peak value $v_0$ of space frequency of the fine uneven structure to be formed satisfies Expression I. Such conditions can be determined according to precondition setting. In this case, the "peak value $v_0$ of space frequency" of the fine uneven structure to be formed can be obtained by the same method as in a case of obtaining the peak value $v$ of space frequency.

Next, a precursor film 12a on which the periodic fine uneven structure is formed (hereinafter, simply referred to as a precursor film 12a) is obtained by removing the resist film 13a. The periodic pattern of the precursor film 12a to be formed is the same as the periodic pattern formed on the resist film 13a.

Although the periodic fine uneven structure is formed in the second step, the uneven structure may be an uneven structure in which the openings 13b are randomly arranged. However, the openings 13b are formed on the resist film 13 such that the peak value $v_0$ of space frequency of the fine uneven structure formed on the precursor film 12 satisfies Expression I. In order to obtain the maximum effect of the present invention, it is desirable that the uneven structure is formed over the entire surface of the precursor film. However, in a case in which least a part of the uneven structure satisfying Expression I is present in the on the surface of the precursor film, it is possible to obtain the effect on the region. It is more desirable that as the size of the uneven structure formed region becomes larger. In a case of an optical member in which the transparent fine uneven structural body is formed on the surface, the same is applied. It is desirable that the fine uneven structure is formed over the entire precursor film which becomes an optically effective surface, but may be formed on a part of the fine uneven structure.

The method of forming a fine uneven structure on the surface of the precursor film 12, as long as the fine uneven structure can be formed on the surface of the precursor film 12, the method is not limited to the above method of forming the resist film 13a, and any method may be used. For example, the fine uneven structure can be formed by simply performing plasma irradiation without using a mask. However, such conditions that the peak value $v_0$ of space frequency of the fine uneven structure formed in the second step is greater than 5 µm$^{-1}$ are preferable. Thus, light scattering can be satisfactorily reduced in the optical member including the transparent fine uneven structural body as an antireflection film.

<Third Step>

Next, the transparent fine uneven structural body 12c is formed by subjecting the precursor film 12a to hot water treatment.

(Hot Water Treatment)

The hot water treatment is performed by immersing the precursor film in a hot water treatment liquid at 70° C. or higher for 1 minute or longer. Although the treatment conditions are different according to the material of the precursor film, the desired peak value of the space frequency, and the like, the temperature of the hot water treatment liquid is preferably 80° C. or higher and more preferably 90° C. or higher. In addition, the immersion time is preferably 20 seconds or longer and 30 minutes or shorter and more preferably 1 minute or longer and 5 minutes or shorter.

It is preferable to use pure water as the raw material of the treatment liquid. From the viewpoint of forming a finer uneven structure, it is more preferable to use pure water having an electric resistivity of 10 M Ω·cm or higher as the hot water treatment liquid. The electric resistivity of the hot water treatment liquid is a value measured at a water temperature of 25° C. using an electrical resistivity meter (device name "HE-200R", manufactured by Horiba Ltd.).

<Interlayer>

Figure 3:
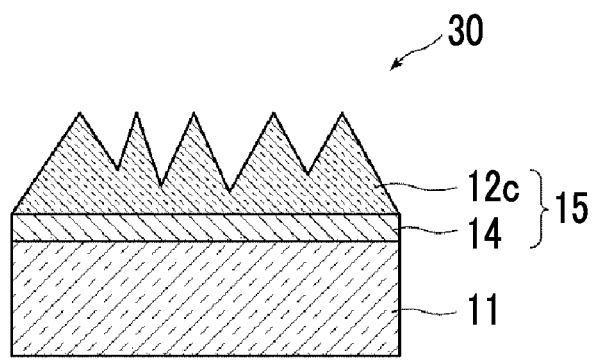
FIG. 3 is a cross-sectional schematic view showing an example of the structure including an interlayer according to the present invention.

The first step may have a step of forming an interlayer between the substrate 11 and the precursor film 12. The interlayer has a role of supporting the transparent fine uneven structural body formed after hot water treatment. FIG. 3 is a cross-sectional schematic view showing an example of a structure including an interlayer in the structure of the above embodiment. As shown in FIG. 3, a structure 30 includes an interlayer 14 and the transparent fine uneven structural body 12c on the substrate 11 in this order. In a case in which the structure 30 is an optical member, the substrate 11 is constituted of a transparent substrate and an antireflection film 15 is constituted of transparent fine uneven structural body 12c and the interlayer 14.

Hereinafter, the configuration of the interlayer in the case in which the structure is an optical member will be described.

—Refractive Index—

It is preferable that the interlayer 14 includes a layer of low refractive index L having a refractive index $n_L$ lower than the refractive index $n_S$ of the transparent substrate, and a layer of high refractive index H having a refractive index $n_H$ higher than the refractive index $n_S$ of the transparent substrate. In a case in which the interlayer 14 has a two-layer structure, the layer of low refractive index L and the layer of high refractive index H are arranged in this order from the transparent substrate side. On the other hand, in a case in which the interlayer 14 includes three or more layers, it is preferable that the layer of low refractive index L and the layer of high refractive index H are alternately arranged. For example, in a case in which the interlayer 14 includes three layers, the layer of low refractive index L, the layer of high refractive index H, and the layer of low refractive index L may be arranged in this order from the transparent substrate side and the layer of high refractive index H, the layer of low refractive index L, and the layer of high refractive index H may be arranged in this order from the transparent substrate side. The interlayer 14 may include four or more layers, and a five-layer structure or a six-layer structure may be employed. In the case in which the interlayer 14 includes three or more layers, as long as the layer of low refractive index L and the layer of high refractive index H are alternately arranged, any one of the layers may be arranged first from the transparent substrate side.

In the interlayer 14, at least one layer of low refractive index L is provided between the layer of high refractive index H and the transparent substrate.

The layer of low refractive index L only has to have the refractive index $n_L$ lower than the refractive index $n_S$ of the transparent substrate, and the layer of high refractive index H only has to have the refractive index $n_H$ higher than the refractive index $n_S$ of the transparent substrate. Particularly, it is preferable that $1.45 < n_L < 1.8$ and $1.6 < n_H < 2.4$.

In a case in which a plurality of layers of low refractive index L is provided, the layers of low refractive index L may not have the same refractive index. It is preferable that the layers of low refractive index are formed of the same material and have the same refractive index from the viewpoint of reducing the material costs, the film formation costs, and the like. Likewise, in a case in which a plurality of layers of high refractive index H is provided, the layers of high refractive index H may not have the same refractive index. It is preferable that the layers of high refractive index H are formed of the same material and have the same refractive index from the viewpoint of reducing the material costs, the film formation costs, and the like.

—Film Thickness—

Each of a thickness $d_L$ of the refractive index layer L and a thickness $d_H$ of the layer of high refractive index H may be determined based on a relationship between the refractive index and the reflected light wavelength and the like. It is preferable that 8 nm<$d_L$<160 nm and 4 nm<$d_H$<16 nm.

—Material—

Examples of the material of the layer of low refractive index L include silicon oxide, silicon oxynitride, gallium oxide, aluminum oxide, lanthanum oxide, lanthanum fluoride, and magnesium fluoride.

Examples of a material of the layer of high refractive index H include niobium oxide, silicon niobium oxide, zirconium oxide, tantalum oxide, silicon nitride, and titanium oxide.

It is preferable that the layer of low refractive index L is formed of silicon oxide and the layer of high refractive index H is formed of silicon-niobium oxide. It is preferable that the layer of low refractive index L is formed of silicon oxynitride and the layer of high refractive index H is formed of niobium oxide.

—Film Formation Method—

It is preferable that each of the layers of the interlayer 14 is formed using a vapor phase deposition method such as vacuum evaporation, plasma sputtering, electron cyclotron sputtering, or ion plating. According to the vapor phase deposition method, a laminate structure which includes layers having various refractive indices and various thicknesses can be easily formed.

In a case in which the structure of the present invention is an optical member and the interlayer has the refractive index distribution as described above, satisfactory antireflection properties can be obtained.

EXAMPLES

Hereinafter, the present invention will be more specifically described based on examples. However, the range of the present invention is not interpreted to be limited by the specific examples shown below.

Example 1

Hereinafter, the manufacturing method in a case in which the structure of the present invention is an optical member will be described.

(First Step)

First, synthetic quartz glass (product name "AQ", manufactured by Asahi Glass Co., Ltd.) which is a transparent substrate was used as the substrate. On the transparent substrate, a thin alumina ($Al_2O_3$) film was formed as the precursor film by electron cyclotron resonance sputtering (ECR) (device name "AFTEX-6000", manufactured by JSW AFTY Corporation) to have a thickness of 80 nm.

(Second Step)

Next, a resist film for electron beams (product name "FEP-171", manufactured by Fujifilm Electronic Materials Co., Ltd.) was applied onto the thin alumina film.

On the entire surface of the resist film for electron beams, a periodic pattern having square openings in which a length of one side is 100 nm arranged at an interval of 200 nm period was drawn by an electronic beam. Then, the resist film was developed to obtain a resist film on which a periodic pattern was formed.

Here, the period of the periodic pattern formed on the resist film was obtained as follows.

The same laminate (thin aluminum oxide film/transparent substrate) as the laminate prepared in the first step was prepared. Subsequently, a fine uneven structure was not formed by not performing electron beam lithography in the second step, and hot water treatment was performed under the same conditions (100° C., immersion for 3 minutes) as in hot water treatment performed in the third step, which will be described later. Thus, an optical member was obtained.

Regarding the optical member, the peak value ν of space frequency was obtained by the above method. The peak value ν of space frequency was 3.34 $\mu m^{-1}$. By taking the inverse number of the peak value ν of space frequency space frequency, the period of unevenness corresponding to the peak value was able to be obtained and the period thereof was 299 nm. In Example 1, in order to obtain an optical member having a peak value of the space frequency of greater than 5 $\mu m^{-1}$, the peak value $\nu_0$ of space frequency of the fine uneven structure formed on the thin alumina film was set to about 5 $\mu m^{-1}$. The peak value $\nu_0$ satisfies Expression I. Therefore, a periodic fine uneven structure in which the period of unevenness was 200 nm and the length of one side of square openings was 100 nm was formed.

Next, the thin alumina film was wet-etched for 10 minutes with FHD-5 (manufactured by Fujifilm Electronic Materials Co., Ltd.) using the resist film on which a periodic pattern was formed as a mask. By the wet etching, the thin alumina film was etched to a depth of about 15 nm.

Subsequently, a periodic fine uneven structure was obtained on the thin alumina film by removing the resist film by immersing the laminate in acetone. The fine uneven structure has a dot pattern in which substantially square openings having a length of one side of substantially 100 nm were formed at a period of about 200 nm so as to reflect the structure of the resist film on which the periodic pattern was formed by isotropic wet etching.

(Third Step)

Then, an optical member was obtained by forming a transparent fine uneven structural body having an alumina hydrate as a main component by immersing the laminate in hot water (pure water) heated to 100° C. for 3 minutes.

Next, Examples 2 and 3 show other methods for forming a fine uneven structure will be described.

Example 2

Example 2 shows a manufacturing method in a case in which the structure is an optical member and a fine uneven structure is formed by using an Ag-deposited mask.

(First Step)

First, synthetic quartz glass (product name "AQ", manufactured by Asahi Glass Co., Ltd.) which is a transparent substrate was used as the substrate. On the transparent substrate, a thin alumina ($Al_2O_3$) film was formed as the precursor film by electron cyclotron resonance sputtering (ECR) (device name "AFTEX-6000", manufactured by JSW AFTY Corporation) to have a thickness of 80 nm.

(Second Step)

Next, Ag was deposited onto the thin alumina film by electron beam (EB) deposition (device name "EVD-1501", manufactured by CANON ANELVA CORPORATION) so as to have a target film thickness of 5 nm. Through self-organization of Ag, Ag particles having a diameter of about 20 to 60 nm were formed over the entire surface of the thin alumina film in a state in which a large number of particles were formed at an interval of about 15 to 50 nm. The peak value of space frequency of the formed Ag particles was 21.17 $\mu m^{-1}$.

Subsequently, the thin alumina film was subjected to plasma etching (device name "NE-500", manufactured by CANON ANELVA CORPORATION) for 50 seconds using the Ag film on which the pattern was formed as a mask. For the etching conditions, the process pressure was set to 1.0 Pa, the etching gas was set to $CHF_3/Ar=5/25$, and the radio frequency (RF) output (Ant/Bias) was set to 700/50 W. The thin alumina film was etched to a depth film thickness of about 20 nm by plasma etching.

Next, a fine uneven structure was obtained on the thin alumina film by removing the thin Ag film formed through self-organization by immersing the laminate in a sodium hydroxide solution.

(Third Step)

Then, an optical member was obtained by forming a transparent fine uneven structural body having an alumina hydrate as a main component by immersing the laminate in hot water (pure water) heated to 100° C. for 3 minutes.

Example 3

Example 3 shows a manufacturing method in a case in which the structure is an optical member and a fine uneven structure is subjected to plasma etching without using a mask.

(First Step)

First, synthetic quartz glass (product name "AQ", manufactured by Asahi Glass Co., Ltd.) which is a transparent substrate was used as the substrate. On the transparent substrate, a thin alumina ($Al_2O_3$) film was formed as the precursor film by electron cyclotron resonance sputtering (ECR) (device name "AFTEX-6000", manufactured by JSW AFTY Corporation) to have a thickness of 80 nm.

(Second Step)

Subsequently, the thin alumina film was subjected to plasma etching (device name "NE-500", manufactured by CANON ANELVA CORPORATION) for 50 seconds. For the etching conditions, the process pressure was set to 1.0 Pa, the etching gas was set to $CHF_3/Ar=5/25$, and the radio frequency (RF) output (Ant/Bias) was set to 700/50 W. The thin alumina film was etched to a depth film thickness of about 20 nm by plasma etching. Thus, a fine uneven structure was formed.

(Third Step)

Then, an optical member was obtained by forming a transparent fine uneven structural body having an alumina hydrate as a main component by immersing the laminate in hot water (pure water) heated to 100° C. for 3 minutes.

Comparative Example 1

An optical member was prepared in the same manner as in Example 1 except that a fine uneven structure was not formed, that is, electron beam lithography was not provided in the second step. The optical member of Comparative Example 1 is the same as the sample prepared in a case of obtaining the peak value v of space frequency in Example 1.

Hereinafter, methods of obtaining a space frequency distribution and a peak value $v_1$ of space frequency and a method of measuring scattered light intensity will be described.

<Methods of Obtaining Space Frequency Distribution and Peak Value $v_1$ of Space Frequency>

For the space frequency distributions of Examples, an electron microscope image (magnification: 6,000 times, acceleration voltage: 7.0 kV) obtained by imaging the surface of the transparent fine uneven structural body which was obtained by hot water treatment after the fine uneven structural body was formed using a scanning electron microscope S-4100 (manufactured by Hitachi Ltd.) was cut into a size of 600×400 pixels and underwent two-dimensional Fourier transformation using an image processing software ImageJ. The intensity spectrum of the obtained two-dimensional space frequency was integrated in an azimuthal angle direction and the intensity of the one-dimensional space frequency spectrum is obtained at a resolution of about 0.015 $\mu m^{-1}$. Further, a relationship between the one-dimensional space frequency and the spectral intensity was calculated by obtaining a front-and-rear three-point moving average. The maximum value of the spectral intensity was set to the maximum value in the space frequency spectrum obtained in advance and the space frequency in a case in which the maximum value was taken was defined as a "peak value".

In addition, the space frequency distribution and the peak value v of space frequency of Comparative Example 1 were obtained by the above method.

<Method of Measuring Scattered Light Intensity>

Figure 4:
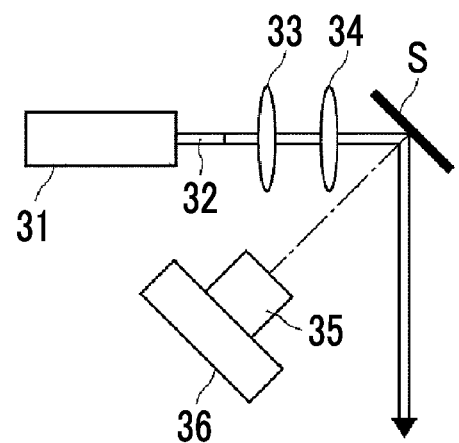
FIG. 4 is a view showing a method of measuring scattered light intensity.

FIG. 4 is a view showing a method of measuring scattered light intensity for Examples and Comparative Example. As shown in FIG. 4, light emitted from a halogen light source 31 (device name "LA-150FBU", manufactured by Hayashi Watch Industry Co., Ltd.) through an optical fiber 32 (core diameter: 230 μm) was changed to parallel light by a lens 33 (focal length f=50 mm), and then condensed on a sample S by a lens 34 (focal length f=200 mm) at an incidence angle of 45 degrees. The surface of the sample was imaged with a CMOS camera 36 (product name "ARTCAM-900MI", manufactured by ARTRAY) on which a C mount lens 35 having a focal length f=8 mm and a F-number of 1.4 (product name "MVL8L", manufactured by TAMRON) is mounted by setting the gain to a value of 64 and a shutter speed value to 3,840. The average value of pixel values of a light condensed region of 128×128 pixels obtained by subtracting the background was set to a scattered light quantity value.

Figure 5:
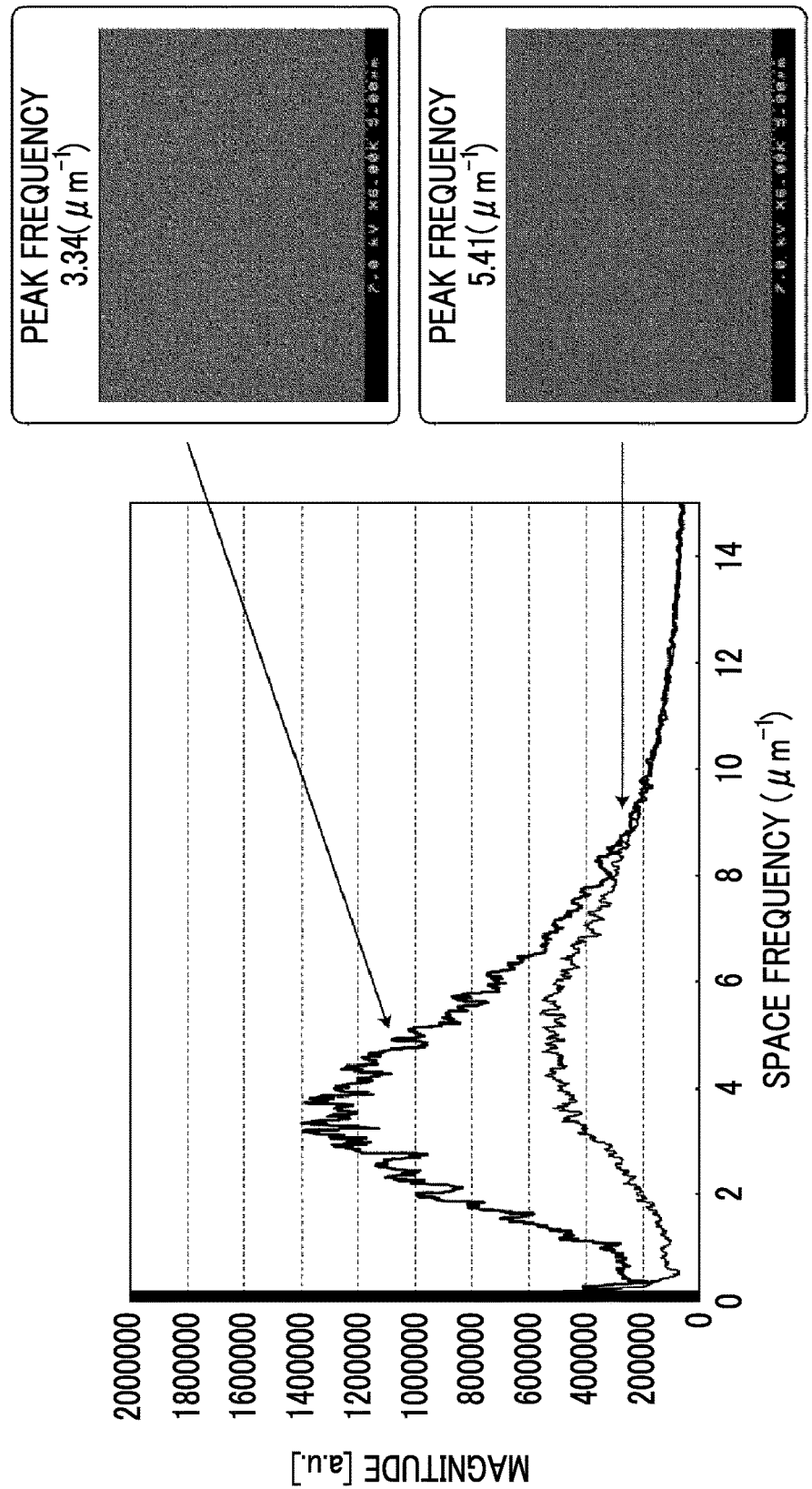
FIG. 5 shows a graph showing space frequency distributions and electron microscope images showing the surfaces of transparent fine uneven structural bodies.

FIG. 5 shows a graph showing the space frequency distributions obtained in Examples 1 and Comparative Example 1 and electron microscope images. In addition, the measurement results of scattered light intensity are shown in Table 1 together with the peak values of space frequency. In Table 1, alumina which is the material of the precursor film is denoted as $Al_2O_3$.

TABLE 1

| | Precursor film | | Fine uneven structure formed on precursor film | Peak value of space frequency | Scattered light quantity value [a.u.] |
|---|---|---|---|---|---|
| | Material | Thickness | | | |
| Example 1 | $Al_2O_3$ film | 80 nm | 100 nm dot pattern at 200 nm period | $v_1$ 5.41 $\mu m^{-1}$ | 1.792 |
| Comparative Example 1 | $Al_2O_3$ film | 80 nm | — | $v$ 3.34 $\mu m^{-1}$ | 4.801 |

As shown in FIG. 5, the peak value $v_1$ of space frequency of the optical member of Example 1 was 5.41 $\mu m^{-1}$ and was higher than 3.34 $\mu m^{-1}$ which is the peak value $v$ of space frequency of the optical member of Comparative Example 1. In addition, from the electron microscope images, it was found that the surface of the transparent fine uneven structural body of Example 1 had a finer uneven structure than the fine uneven structure of Comparative Example 1.

As shown in Table 1, it was found that the scattered light quantity of the optical member of Example 1 was lower than the scattered light quantity of the optical member of Comparative Example 1 obtained by the manufacturing method of the related art.

Further, the effect of making the space frequency high and reducing the scattered light quantity was able of be obtained also in Examples 2 and 3, similar to Example 1.

<Refractive Index Distribution>

Figure 6:
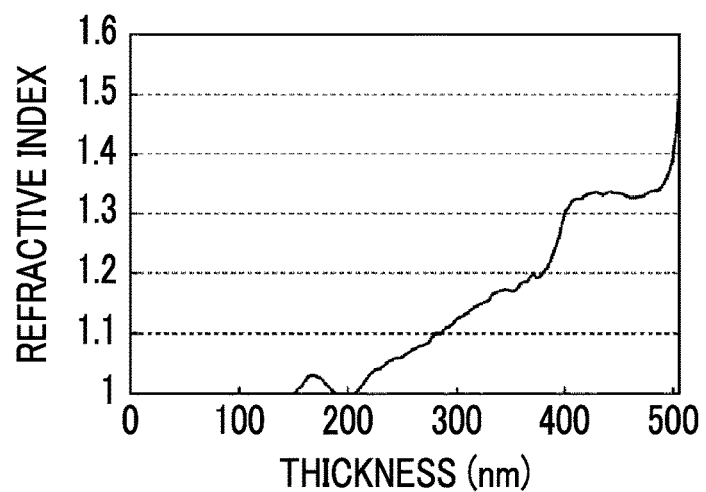
FIG. 6 is a graph showing a refractive index distribution.

FIG. 6 is a graph showing a refractive index distribution of a transparent fine uneven structural body formed on a Si substrate by the same steps as in Examples. The refractive index distribution was obtained from spectral ellipsometry measurement with a spectral ellipsometer MASS (manufactured by Five Lab Co., Ltd.) and reflectivity measurement with a reflection spectral film thickness meter FE-3000 (manufactured by Otsuka Electronics Co., Ltd.).

In FIG. 6, a part of the refractive index 1 present in a range of 0 nm to 155 nm on the lateral axis corresponds to air, a range of 155 nm to 505 nm on the lateral axis corresponds to the transparent fine uneven structural body, and a range of 155 nm on the lateral axis corresponds to the most convex portion of the transparent fine uneven structural body. The refractive index gradually increases from the surface of the transparent fine uneven structural body and is maximized at the interface with the transparent substrate.

<Reflectivity in Case of Insertion of Interlayers>

Figure 7:
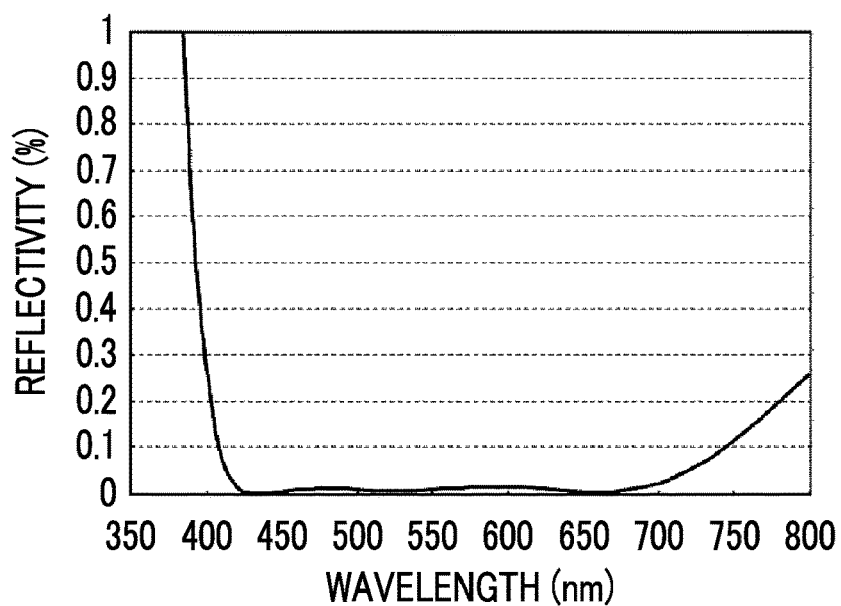
FIG. 7 is a graph showing wavelength dependency of the reflectivity of a sample including interlayers.

The reflectivity of a sample in which interlayers were inserted into the optical member prepared in Example 1 using an optical simulation software Macleod (manufactured by Thin Film Center) was obtained. In Table 2, the layer configuration of the interlayers incorporated in the simulation is shown. For the interlayers, silicon oxynitride (refractive index: 1.51548) and niobium oxide (refractive index: 2.33002) were used. However, the layer configuration is a sample configuration before hot water treatment is performed. In FIG. 7, the simulation results are shown. FIG. 7 is a graph showing wavelength dependency of reflectivity.

TABLE 2

| Example 1 | Refractive index | Film thickness (nm) |
|---|---|---|
| $Al_2O_3$ | — | 80 |
| Interlayer 6 | 1.51548 | 131.19 |
| Interlayer 5 | 2.33002 | 11.77 |
| Interlayer 4 | 1.51548 | 63.5 |
| Interlayer 3 | 2.33002 | 13.37 |

TABLE 2-continued

| Example 1 | Refractive index | Film thickness (nm) |
|---|---|---|
| Interlayer 2 | 1.51548 | 69.43 |
| Interlayer 1 | 2.33002 | 5 |
| Glass material | 1.519 | — |

As shown in FIG. 7, the reflectivity was 0.1% or less from the vicinity of a wavelength of 400 nm to the vicinity of 740 nm. It was confirmed that the structure exhibited extremely satisfactory antireflection properties as the optical member.

The structure manufactured by the manufacturing method of the present invention may include a ND filter, light shielding filter, color filter, and the like in which the transparent fine uneven structural body is provided on the substrate as a part of the antireflection film. In addition, the optical member using the transparent substrate may include a lens, a beam splitter, a dichroic mirror, and the like.

EXPLANATION OF REFERENCES 10, 30: structure
11: substrate
12: precursor film
12a: precursor film on which periodic fine uneven structure is formed
12b, 13b: opening
12c: transparent fine uneven structural body
13: resist film
13a: resist film on which periodic fine uneven structure is formed
14: interlayer
15: antireflection film
31: halogen light source
32: optical fiber
33, 34: lens
35: mount lens
36: camera
S: sample

What is claimed is:

1. A method of manufacturing a structure comprising a substrate and a transparent fine uneven structural body which is formed on a surface of the substrate by hot water treatment, the method comprising:
a first step of forming a precursor film of the transparent fine uneven structural body on the substrate;
a second step of forming a fine uneven structure on a surface of the precursor film; and
a third step of forming the transparent fine uneven structural body by subjecting, to hot water treatment, the precursor film on which the fine uneven structure is formed,
the fine uneven structure formed in the second step satisfying the following Expression I, $$v < v_0 \qquad \text{Expression I}$$

wherein in Expression I, $v_0$ represents a peak value of space frequency of the fine uneven structure formed in the second step, and $v$ represents a peak value of space frequency of a transparent fine uneven structural body obtained in a case in which hot water treatment is performed under the same condition as in the hot water treatment in the third step without forming the fine uneven structure on the surface of the precursor film.

2. The method of manufacturing a structure according to claim 1, wherein the peak value $v_0$ of space frequency of the fine uneven structure formed in the second step is greater than 5 $\mu m^{-1}$.

3. The method of manufacturing a structure according to claim 1, wherein the fine uneven structure in the second step is periodic.

4. The method of manufacturing a structure according to claim 1, wherein the second step is a step of forming a mask having a plurality of openings on the precursor film and dissolving a part of the surface of the precursor film using the mask to form the fine uneven structure.

5. The method of manufacturing a structure according to claim 1, wherein the second step is a step of forming a mask having a plurality of openings on the precursor film and peeling off a part of the surface of the precursor film using the mask to form the fine uneven structure.

6. The method of manufacturing a structure according to claim 1, wherein the transparent fine uneven structural body has an alumina hydrate as a main component.

7. The method of manufacturing a structure according to claim 6, wherein the precursor film comprises at least one selected from an aluminum oxide, an aluminum hydroxide, an aluminum nitride, or aluminum as a main component, and the alumina hydrate is obtained by subjecting the precursor film to hot water treatment.

8. The method of manufacturing a structure according to claim 6, wherein the precursor film comprises at least one selected from $ZrO_2$, $SiO_2$, $TiO_2$, ZnO, or MgO, the precursor film comprises at least one selected from an aluminum oxide, an aluminum hydroxide, an aluminum nitride, or aluminum as a main component, and the alumina hydrate is obtained by subjecting the precursor film to hot water treatment.

9. The method of manufacturing a structure according to claim 1, wherein the first step comprises a step of forming an interlayer between the substrate and the precursor film.

10. The method of manufacturing a structure according to claim 1, wherein the structure is an optical member formed by providing an antireflection film on a transparent substrate, the substrate is the transparent substrate, and the antireflection film is formed by providing the transparent fine uneven structural body on a surface thereof.

* * * * *